Feb. 28, 1950  C. KELLER  2,498,924
PIPE JOINT

Filed May 28, 1948  2 Sheets-Sheet 1

Inventor
Curt Keller

By Dodge

Attorneys

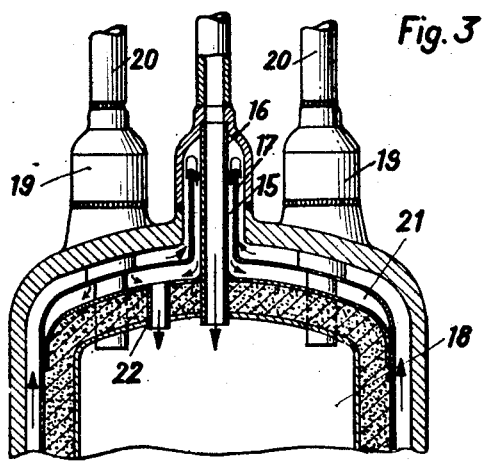
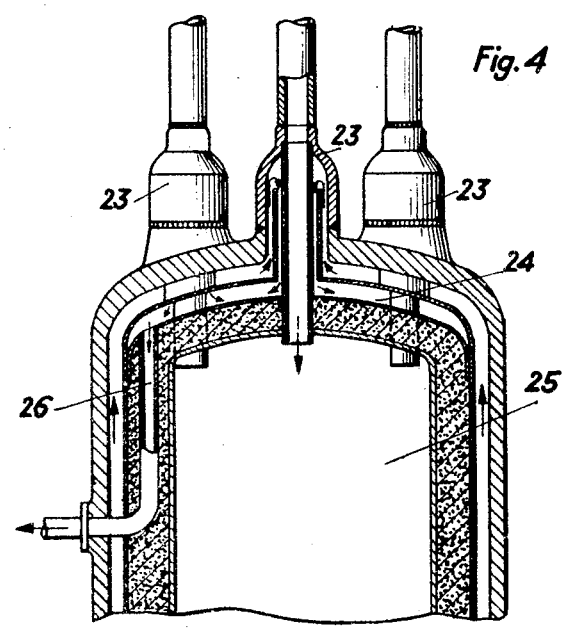

Patented Feb. 28, 1950

2,498,924

UNITED STATES PATENT OFFICE 2,498,924

PIPE JOINT

Curt Keller, Kusnacht, Switzerland, assignor to Aktiengesellschaft fuer Technische Studien, Zurich, Switzerland, a corporation of Switzerland Application May 28, 1948, Serial No. 29,908
In Switzerland July 10, 1947

6 Claims. (Cl. 285—22)

1

This invention relates to a double-walled hollow structure for the reception of highly heated media under pressure and more particularly to a structure of this nature for use in thermal power plants. Such a structure includes between its two walls, a space through which a cooling medium flows, and with its outer wall there are associated a plurality of pipe junctions for the connection of pipes with the hollow interior of the said structure.

Double-walled structures of this kind are used, for example, as collectors in the heaters forming parts of thermal power plants in which a circulated working medium, preferably air, after its temperature has been raised in a heater by a supply of heat derived from an external source, is expanded in at least one machine to provide energy for at least one consumer of useful energy and then, after cooling, is again brought to a higher pressure in at least one machine. In such a plant the working medium, which has been heated, preferably in a multitubular heater, and is under pressure, is collected in the said collector and flows thence to the machine or machines in which it is expanded.

The inner wall of a double-walled structure of this kind is usually made of thin sheet metal which must be heat-resisting but, like the insulating layer with which this fall is covered need not be of great strength. The outer wall, on the other hand, must be made of a metal of great strength. The highly heated medium, under a pressure of for example 50 atmospheres, may flow at a temperature of more than 700° C. through the pipe junctions which connect the pipes fixed to the outlet end of the heater tubes to the inner chamber of the hollow double-walled structure. Under such working conditions there is risk of so much heat flowing from the highly heated pipe junctions to the outer wall that this latter likewise becomes highly heated. This however is highly undesirable, because as is well known, the strength of even highly alloyed steels decreases rapidly when a certain critical temperature is exceeded. Thus, for example, at the abovementioned temperature of 700° C. the strength of such alloy steels is only a fractional part of their strength at say 300° C. Since, however, the outer wall of the structure has to be strong enough to withstand heavy stresses at high temperatures and pressures, it is obvious that heating of the outer wall of a structure of the kind in question must as far as possible be prevented.

For this purpose according to the present invention, each pipe junction in a double-walled

2 structure of the kind herein referred to is provided internally with an arrangement of hollow or tubular members so disposed one within another, in coaxial relation to the corresponding pipe junction as to provide spaces which serve as guide passages for a portion of the cooling medium supplied to the intermediate space between the two walls of said double-walled structure, the said arrangement being such that the transmission of heat to the pipe junction from the highly heated medium flowing through the innermost of the hollow members therein is, to a large extent prevented. Cooling medium, which has passed through the spaces delimited by the said hollow members, may then pass, either directly or through a discharge chamber which is common to the cooling spaces of all the pipe junctions into the interior chamber of the double-walled structure.

Alternatively, the cooling medium may pass from the cooling spaces of the several pipe junctions into a discharge chamber which, though common to all of the said junction cooling spaces, is completely separated from the interior chamber of the double-walled structure.

Several constructional embodiments of the subject matter of the invention are shown, by way of example, in the accompanying drawings, in which Figure 1 shows, in axial section a double-walled collector with pipe junctions, in the interior of each of which spaces are delimited by two sleeves arranged co-axially therewith, said spaces communicating with each other and also with the inner chamber of the collector and with the jacket space between the two walls of said collector;

Figure 3 shows a form of construction in which the spaces between two sleeves in the interior of each of the pipe junctions are connected to a common discharge chamber which, in its turn communicates with the inner chamber of the collector;

Figure 4 shows another form of construction in which the spaces between the two sleeves in each of the several pipe junctions are connected to a common discharge chamber which is completely separated from the inner chamber of the collector but is connected to an outlet pipe of its own.

Figure 1:
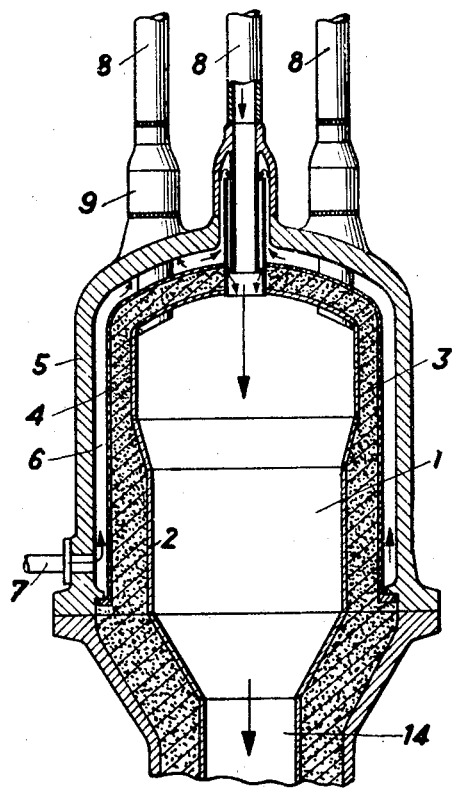

In Figure 1 the reference numeral 1 denotes a collecting chamber for a highly heated medium under pressure. This chamber 1 is bounded by an inner wall 2 of metal resistant to high temperature, said wall 2 being surrounded by a layer 3 of insulating material the function of which is to prevent heat losses by radiation. The insulating layer 3 is surrounded in its turn, by a sheet metal sheathing 4. Reference 5 denotes a bell-shaped outer metal wall, which is made of a material of great strength. Into a jacket space 6 between the outer wall 5 and the sheath 4, pipe 7 delivers a cooling medium at a pressure which is only slightly higher than the pressure of the highly heated medium to be collected in the chamber 1. Consequently, the parts 2, 3 and 4 are substantially relieved of pressure and, so far as strength is concerned, they do not have to satisfy any stringent requirements. On the other hand, the outer wall 5 must be capable of withstanding the pressure existing in the cooling chamber 6.

Assuming for instance that the structure described is intended to serve as a collector for air heated in a heater to about 670° C. and at a pressure of say 50 atmospheres for use in a thermal power plant in which air circulates in a closed cycle and, after having been heated in a heater, is expanded in a turbine for the performance of useful work and is thereafter brought to a higher pressure in a compressor (see for example the patent to Keller 2,172,910, September 12, 1939), then the cooling medium supplied to the chamber 6 may be air taken from the cycle between the delivery end of the compressor and the point at which the compressed air enters the heater.

The highly heated air flows through pipes 8 to the collecting chamber 1 to which the said pipes 8 are connected through pipe junctions 9. These latter widen out in their approach to the outer wall 5, to which they are welded. In the widened part of each pipe junction 9 and in coaxial relation thereto two sleeves 10 and 11 are provided. The sleeve 10, which is within the sleeve 11, is formed integrally with the main body of the associated pipe junction 9. It is shown as having an internal diameter which is equal to that in the unwidened part of said junction and likewise, equal to the internal diameter of the attached pipe 8. The outer sleeves 11 associated with the several pipe junctions 9 are all secured to the metal sheath 4 and they open directly into the collecting chamber 1. Clearance between each outer sleeve 11 and the inner surface of the widened part of the corresponding pipe junction 9 provides a cylindrical duct 12, which, at its upper end, communicates with another cylindrical duct 13 formed by clearance between each two associated sleeves 10 and 11. The duct 12 also communicates directly with the cooling chamber 6 while the duct 13 communicates directly with the collecting chamber 1. In consequence of this arrangement a portion of the cooling medium which enters the cooling chamber 6 can pass through the cylindrical ducts 12 and 13, directly into the collecting chamber 1.

The cooling medium flowing through the cylindrical ducts 12 and 13 prevents, to a very large extent, the transmission of heat to the pipe junctions 9 from the very hot inner sleeves 10, through which the highly heated medium passes; similarly it largely prevents heat radiation from the outer sleeves 11 to those parts of the outer wall 5 which surrounds them. In this way dangerous overheating of this wall 5 is avoided.

The highly heated medium under pressure which collects in the chamber 1 can flow out of this latter through an outlet duct 14.

The type of construction herein described permits the pipes 8 and the pipe junctions 9 to be made of a steel having a high coefficient of thermal expansion while the outer wall 5 may be made of a steel with a low coefficient of thermal expansion; this is due to the fact that the above described cooling system enables the welded seams between the two kinds of steels to be cooled down to such a low temperature (e. g. down to 200° C.) that no dangerous thermal stresses are set up in these seams.

In Figure 3 reference 19 denotes pipe junctions connecting the several pipes 20 to the outer wall of the double-walled structure. In this embodiment the junction-cooling arrangement differs from the one first described mainly in that the cylindrical ducts 15 between the inner sleeves 16 and the outer sleeves 17, instead of communicating directly and severally with the inner chamber 18 of the double-walled structure, open into a common discharge chamber 21 which, in turn, communicates with said chamber 18 through a pipe 22.

It will be noted that in this example the sleeve 16, instead of being an integral part of the pipe junction 19, consists of a separate tube the upper end of which enters and is fixed in a counterbore in the unwidened upper part of said junction, with which said sleeve is coaxial. Again the internal diameter of the sleeve 16 is equal to that of the pipe 20 and to that of the main bore in the top of the junction 19.

In the junction-cooling arrangement shown in Figure 4 a discharge chamber 24 common to the cooling ducts of all the pipe junctions 23, receives the cooling medium issuing from said ducts. This chamber 24 is completely separated from the interior chamber 25 of the double-walled structure and has its own outlet pipe 26 for discharge of this part of the cooling medium.

All of the embodiments above described have essentially similar operative characteristics. The highly heated gases under high pressure would normally develop high bursting stresses in the thin heat resisting inner shell but the stresses which would otherwise be developed in that shell are neutralized by the cooling fluid which circulates under moderately higher pressure in the jacket space between the thin heat resisting inner shell and the heavy pressure sustaining outer shell. Since the outer shell is shielded against the flow of heat to it, it operates within a moderate temperature range in which it has good mechanical properties, and need not be constructed of expensive heat resisting materials.

The spaced and nested sleeves function as a sort of cylindrical labyrinth and guide portions of the cooling fluid in two passes enveloping the hot gases flowing from the pipes 8 into the collector. The branch connections are thus individually protected.

Figure 2:
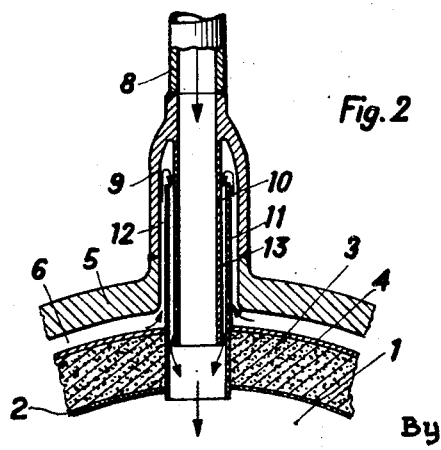
Figure 2 shows in axial section and to a larger scale the constructional details of a pipe junction as in Figure 1.

In cases where the cooling fluid is derived from the circuit of the plant and hence is (except in temperature) identical with the working medium delivered by the pipes 8, the cooling medium may be fed directly into the collector and consequently back into the flow circuit of the system. Such conditions exist in the embodiment of Figs. 1 and 2 and the embodiment of Fig. 3. Where for any reason mixture of the cooling medium with the working medium in the circuit is not desired, it is practicable to maintain complete isolation. One mode of doing so is illustrated in Fig. 4.

What is claimed is:

1. A structure for the reception of a highly heated medium under pressure, comprising an inner hollow body made of a heat-resisting material of relatively small strength; an outer body of a metal having great strength surrounding said inner hollow body, a jacket space left between said inner body and said outer body; pipe junctions fixed to said outer body and opening into the hollow interior of said inner body; an arrangement of tubular bodies in each of said junctions, which tubular bodies are so disposed one within another in co-axial relation to the corresponding pipe junction as to provide spaces which serve as guide passage for a portion of cooling medium supplied to said jacket space, said arrangement being such as to prevent, to a large extent, the transmission of heat to the pipe junction from a highly heated medium flowing through the innermost of the tubular bodies therein; and an outlet pipe connected to the hollow interior of said inner body.

2. A structure for the reception of a highly heated medium under pressure, comprising an inner hollow body made of a heat-resisting material of relatively small strength; a heat insulating layer covering said hollow body; an outer body of a metal having great strength surrounding said inner hollow body, a jacket space being left between said insulating layer and said outer body; pipe junctions fixed to said outer body and widening in the approach to this body; a sleeve within each of said pipe junctions having substantially the same internal diameter as the unwidened part of the junction, said sleeve extending from said unwidened part to a place of discharge into the hollow interior of said inner body; a second sleeve anchored to said inner hollow body and surrounding said first mentioned sleeve, clearance spaces, forming ducts for a cooling medium, being provided between the outer sleeve and the widened part of the pipe junction, on the one hand, and between the two sleeves, on the other hand, said ducts communicating with each other, further with the space between the two bodies of the double-walled structure and being also directly connected to a space into which the cooling medium flowing through them can escape; and an outlet pipe connected to the hollow interior of said inner body.

3. A structure for the reception of a highly heated medium under pressure, comprising an inner hollow body made of a heat-resisting material of relatively small strength; a heat insulating layer covering said hollow body; an outer body of a metal having great strength surrounding said inner hollow body, a jacket space being left between said insulating layer and said outer body; pipe junctions fixed to said outer body and widening in the approach to this body; a sleeve within each of said pipe junctions having substantially the same internal diameter as the unwidened part of the junction, said sleeve extending from said unwidened part to a place of discharge into the hollow interior of said inner body; a second sleeve anchored to said inner hollow body and surrounding said first mentioned sleeve, clearance spaces, forming ducts for a cooling medium, being provided between the outer sleeve and the widened part of the pipe junction, on the one hand, and between the two sleeves, on the other hand, said ducts communicating with each other, further with the space between the two bodies of the double-walled structure and also with the hollow interior of said inner hollow body; and an outlet pipe connected to the hollow interior of said inner body.

4. A structure for the reception of a highly heated medium under pressure, comprising an inner hollow body made of a heat-resisting material of relatively small strength; a heat insulating layer covering said hollow body; an outer body of a metal having great strength surrounding said inner hollow body, a jacket space being left between said insulating layer and said outer body; pipe junctions fixed to said outer body and widening in the approach to this body; a sleeve within each of said pipe junctions having substantially the same internal diameter as the unwidened part of the junction, said sleeve extending from said unwidened part to a place of discharge into the hollow interior of said inner body; a second sleeve anchored to said inner hollow body together with which it defines a discharge chamber and also surrounding a part of said first mentioned sleeve, clearance spaces, forming ducts for a cooling medium, being provided between the outer sleeve and the widened part of the pipe junction, on the one hand, and between the two sleeves, on the other hand, said ducts communicating with each other, further with the space between the two bodies of the double-walled structure and also with said discharge chamber; and an outlet pipe connected to the hollow interior of said inner body.

5. A structure for the reception of a highly heated medium under pressure, comprising an inner hollow body made of a heat-resisting material of relatively small strength; a heat insulating layer covering said hollow body; an outer body of a metal having great strength surrounding said inner hollow body, a jacket space being left between said insulating layer and said outer body; pipe junctions fixed to said outer body and widening in the approach to this body; a sleeve within each of said pipe junctions having substantially the same internal diameter as the unwidened part of the junction, said sleeve extending from said unwidened part to a place of discharge into the hollow interior of said inner body; a second sleeve anchored to said inner hollow body together with which it defines a discharge chamber and also surrounding a part of said first mentioned sleeve, clearance spaces, forming ducts for a cooling medium, being provided between the outer sleeve and the widened part of the pipe junction, on the one hand, and between the two sleeves, on the other hand, said ducts communicating with each other, further with the space between the two bodies of the double-walled structure and also with said discharge chamber; an escape connecting the last mentioned chamber with the hollow interior of said inner hollow body; and an outlet pipe connected to the hollow interior of said inner body.

6. A structure for the reception of a highly heated medium under pressure, comprising an inner hollow body made of a heat-resisting material of relatively small strength; a heat insulating layer covering said hollow body; an outer body of a metal having great strength surrounding said inner hollow body, a jacket space being left between said insulating layer and said outer body; pipe junctions fixed to said outer body and widening in the approach to this body; a sleeve within each of said pipe junctions having substantially the same internal diameter as the unwidened part of the junction, said sleeve extending from said unwidened part to a place of discharge into the hollow interior of said inner body; a second sleeve anchored to said inner hollow body together with which it defines a discharge chamber completely separated from the hollow interior of said inner body, said second mentioned sleeve also surrounding a part of said first mentioned sleeve and clearance spaces, forming ducts for a cooling medium, being provided between the outer sleeve and the widened part of the pipe junction, on the one hand, and between the two sleeves, on the other hand, said ducts communicating with each other further with the space between the two bodies of the double-walled structure and also with said discharge chamber; an outlet pipe opening into said discharge chamber; and a further outlet pipe connected to the hollow interior of said inner body.

CURT KELLER.

REFERENCES CITED

The following references are of record in the file of this patent:

UNITED STATES PATENTS

| Number | Name | Date |
|---|---|---|
| 2,210,480 | Brice | Aug. 6, 1940 |